United States Patent [19]
Schroder et al.

[11] Patent Number: 5,685,971
[45] Date of Patent: Nov. 11, 1997

[54] APPARATUS AND METHOD FOR FORMING A VARIABLE DIAMETER HOLE IN A CONDUCTIVE WORKPIECE

[75] Inventors: Lawrence Joseph Schroder, Ft. Thomas, Ky.; Lathan Merriman Wayman, Blanchester; Oleg Edelman, Cincinnati, both of Ohio

[73] Assignee: General Electric Company, Cincinnati, Ohio

[21] Appl. No.: 768,131

[22] Filed: Sep. 30, 1991

[51] Int. Cl.$^6$ .............. B23H 3/00; B23H 9/10; B23H 9/14; B23H 7/30

[52] U.S. Cl. .............. 205/642; 205/645; 205/665; 205/672; 205/686; 204/224 M; 204/225; 204/228

[58] Field of Search .............. 204/129.2, 129.55, 204/129.7, 224 M, 225, 284, 290 R, 228; 205/642, 645, 665, 672, 686

[56] References Cited

U.S. PATENT DOCUMENTS

| | | | |
|---|---|---|---|
| 3,058,895 | 10/1962 | Williams | 204/143 |
| 3,306,838 | 2/1967 | Johnson | 204/129.2 X |
| 3,748,252 | 7/1973 | Joslin | 204/284 |
| 3,793,169 | 2/1974 | Joslin | 204/129.55 |
| 3,849,271 | 11/1974 | Joslin | 204/129.2 |
| 4,104,503 | 8/1978 | Di Piazza et al. | 204/129.55 X |
| 4,687,563 | 8/1987 | Hayes | 204/224 M |
| 4,767,903 | 8/1988 | Sciaroni | 204/129.2 X |

*Primary Examiner*—Donald R. Valentine
*Attorney, Agent, or Firm*—Andrew C. Hess; Nathan D. Herkamp

[57] ABSTRACT

A method and apparatus for forming a passage with a variable diameter along its length in a conductive workpiece are disclosed. The workpiece is mounted in a fixture and an externally insulated hollow electrode is positioned proximate to a surface location of the workpiece into which the passage is to be formed. A first selected voltage is connected between the electrode and the workplace with the voltage being connected to cause the electrode to act as a cathode and the workpiece to act as an anode. A pump causes an acidic electrolyte to flow through the electrode at a chosen pressure and onto the workpiece surface. The electrode is moved toward the workpiece at a first selected feed rate by a CNC controller to cause a portion of the passage to be formed at a first predetermined diameter. The CNC controller causes at least one of the first selected DC voltage to switch to a different selected DC voltage or the first selected feed rate to switch to a different selected feed rate when a predetermined depth is sensed by an encoder to cause another portion of the passage to be drilled at a second predetermined diameter.

8 Claims, 2 Drawing Sheets

APPARATUS AND METHOD FOR FORMING A VARIABLE DIAMETER HOLE IN A CONDUCTIVE WORKPIECE

BACKGROUND OF THE INVENTION

The present invention relates to forming a variable diameter hole through a conductive workpiece and, more particularly, to an apparatus and method for forming a cooling air metering hole or passage, with a variable diameter along its depth, in a gas turbine engine component, such as a high pressure turbine blade or the like, using variable feed shaped tube electrolytic machining (STEM) drilling.

STEM is a variation of electrochemical machining (ECM) for drilling small diameter deep holes of up to about 12" in depth with a diameter as small as about 0.025" in high performance gas turbine engine components, such as those used for aircraft propulsion and the like, which are made from super alloy type materials. STEM drilling involves providing a tube or hollow electrode through which an electrolyte is pumped under a predetermined pressure onto a surface area of a conductive workpiece where a hole or passage is to be drilled. The electolyte is preferably a solution of sulfuric acid; although, a solution of hydrochloric acid may be used for drilling hard metals, such as titanium alloys and the like. A direct current (DC) electrical potential is connected between the electrode and the workpiece to cause controlled deplating of the electrically conductive workpiece when the electrically conductive fluid or electrolyte flows from the electrode onto the workpiece. The deplating action takes place in an electrolytic cell formed by the negatively charged metallic electrode (cathode) and the positively charged workpiece (anode) separated by the flowing electrically conductive fluid (electrolyte).

Referring to FIG. 1, in a present method for forming a metering hole 10 in a high pressure turbine blade 12 of a gas turbine engine includes the step of STEM drilling a primary or radial hole 14 having a uniform diameter from the blade tip 16 internally through the blade to an interior plenum 18. The uniform diameter radial hole 14 is formed by maintaining the voltage, current, feed rate of the electrode and other STEM parameters constant during the drilling operation to maintain a uniform hole diameter. A tip plug 20 is fitted into the predetermined inner diameter of radial hole 14 and is brazed into the hole 14 proximate to the blade tip 16. A metering hole 10 having a predetermined diameter narrower than hole 14 is formed through tip plug 20 either by electrode discharge machining (EDM) or by laser drilling. The turbine blade is then x-rayed to inspect the braze seal holding the tip plug 20 in place. The tip plug 20 with metering hole 10 serves to control the volume of film cooling air passing through plenum 18, into hole 14 and through a multiplicity of trailing edge cooling holes 22 to cool the trailing edge 23 of blade 12 during engine operation.

A problem with forming a metering hole 10 through a brazed tip plug 20 is that the tip plug 20 may be forced out of radial hole 14 after many hours of operation or because of a defective braze seal. Loss of tip plug 20 can result in improper metering of cooling air streams through the blade interior and out cooling holes 22 to properly cool the blade, and therefore, damage to the blade can result. The present invention provides a method and apparatus for forming a variable diameter radial hole and integrally formed metering hole which is formed entirely of the parent blade material and does not require a brazed tip plug 20.

A method for drilling a hole through a workpiece which varies in diameter along the depth of the hole is disclosed in U.S. Pat. No. 3,793,169, issued to Joslin. Joslin discloses that a hole with a profiled cross section can be formed by varying the DC current flowing between the ECM electrode and the workpiece being drilled as a function of the depth through the workpiece. By controlling the current, Joslin is limited as to the size or diameter of the hole which can be formed for a given electrode or tube size. Additionally, Joslin does not teach that a variable diameter hole along the depth of the hole can be formed by varying the feed rate of the electrde during a drilling operation or by varying both the feed rate of the tube or electrode through the workpiece and the DC voltage connected between the electrode and the workpiece in tandem.

SUMMARY OF THE INVENTION

It is, accordingly, a primary object of the present invention to provide a novel method and apparatus for forming a variable diameter versus depth hole in a conductive workpiece which are not subject to the foregoing disadvantages.

It is another object of the present invention to provide a novel method and apparatus for forming a metering hole in a gas turbine engine component which is entirely formed of parent material and does not require the attachment of a tip plug.

In accordance with the present invention, a method for forming a passage in a conductive workpiece with a variable diameter along its depth, includes the steps of: positioning an externally insulated hollow electrode having a predetermined inner and outer diameter proximate to a surface of the workpiece into which the passage is to be formed; pumping an acidic electrolyte through the electrode at a chosen pressure and onto the workpiece surface; connecting a first selected DC voltage between the electrode and the workpiece, the voltage being connected with a polarity to cause the electrode to act as a cathode and the workpiece to act as an anode; moving the electrode toward the workpiece at a first selected feed rate to cause a portion of the passage to be formed at a first predetermined diameter; sensing a depth of the electrode as the electrode moves through the workpiece to form the passage; and switching at least one of the first selected DC voltage to a different selected DC voltage with the same polarity and/or switching the first selected feed rate to a different selected feed rate when a predetermined depth is sensed to cause another portion of the passage to be drilled at a second predetermined diameter.

In accordance with the present invention, an apparatus for forming a passage with a variable diameter along its depth through a conductive workpiece includes an externally insulated hollow electrode having a predetermined inner and outer diameter. A variable DC voltage source is connectable between the electrode and the workpiece, the voltage source being connectable to cause the electrode to act as a cathode and the workpiece to act as an anode. The apparatus further includes a pump for pumping an acidic electrolyte through the hollow electrode at a chosen pressure and onto a surface of the workpiece through which the passage is to be formed. The hollow electrode is mounted to a moveable ram which is operated by a servomotor. The servomotor is connected to a computer numerical control (CNC) controller which is programmed to cause the servomotor to move the electrode toward the workpiece at a first selected feed rate to cause a portion of the passage to be drilled at a first predetermined diameter. An encoder is connected to the ram for sensing a depth of the electrode as the electrode moves through the workpiece to form the passage. The CNC controller is further programmed to switch either the variable DC voltage source from a first selected DC voltage level to a different selected DC voltage level with the same polarity, or to switch the servomotor from moving the electrode at the first selected feed rate to a different selected feed rate, or to switch both the voltage level and the feed rate in tandem, when a predetermined depth is sensed to cause another portion of the passage to be formed at a second predetermined diameter.

These and other objects of the invention, together with the features and advantages thereof, will become apparent from the following specification when read with the accompanying drawings.

DETAILED DESCRIPTION OF THE PREFERRED EMBODIMENT

Figure 1:
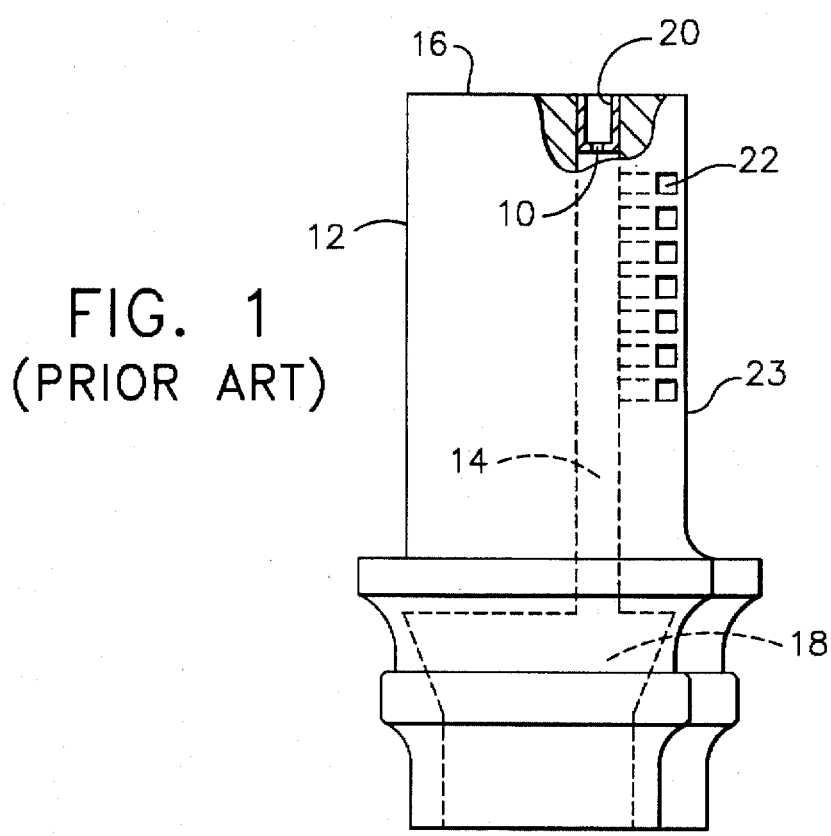
FIG. 1 is a side elevation view of a high pressure turbine blade showing an internal metering hole in accordance with the prior art.

A STEM device 24 for forming a passage 26 having a variable diameter along its depth through a conductive workpiece 28 includes an externally insulated hollow electrode 30. Workpiece 28 is preferably mounted in a suitable fixture 29 to hold it in place during STEM drilling. Electrode 30 includes a titanium tube 32 with a dielectric coating 34 having a thickness of between about 0.015" and about 0.005". Coating 34 limits electrolytic action to the desired machining area and may be an alkanex coating or similar dielectric material resistant to electrolytic action and the acid electrolytes used in the STEM process for drilling super alloys and the like. The electrode is sized and shaped in accordance with the diameter and geometrical shape of the hole or passage 26 desired to be formed through workpiece 28. For example, an electrode 30 having an outer diameter of about 0.019" can form a passage through a workpiece having a variable diameter between about 0.022" and about 0.055" by controlling the voltage and feed rate of the electrode 30 as discussed in more detail hereinafter. Additionally, the wall thickness of titanium tube 32 must be sufficient to conduct the required current for electrolytic action and to provide for enough over-cut to allow for free passage of the electrolyte out of a cutting gap 36 between electrode 30 and workpiece 28.

Electrode 30 is mounted to a ram arrangement 38 which is moveable to advance the electrode 30 through the workpiece during the drilling operation. A servomotor 40 is connected to ram arrangement 38 by a screw 42 or similar motion device for advancing electrode 30 into workpiece 28 during a drilling operation. Means for advancing electrode 30, such as ram arrangement 38, are known in the ECM art.

In accordance with the present invention, motor 40 is electrically connected by a suitable communications link 44 to a CNC controller 46 which may be programmed to control the advancement of the ram arrangement 38 and thereby the feed rate of electrode 30 through workpiece 28 to cause variation in the diameter of passage 26 at predetermined depths through workpiece 28. CNC controller 46 may also contain a variable DC voltage source 48 which is connected between electrode 30 and workpiece 28. Variable DC voltage source 48 is connected between electrode 30 and workpiece 28 with a polarity such that the electrode 30 will act as a cathode and the workpiece 28 will act as an anode. CNC controller 46 may also be programmed to vary the voltage between the electrode 30 and the workpiece 28 to cause the diameter of passage 26 to vary as a function of depth through workpiece 28. The voltage from variable DC voltage source 48 may vary from about 3 volts DC to about 15 volts DC.

While variable DC voltage source 48 has been described as being integral with CNC controller 46, those skilled in the art will recognize that an external variable voltage source which is interconnected to controller 46 for variation of the voltage during the drilling operation could equally be used. Variable DC voltage source 48 is connected to electrode 30 and to workpiece 28 by conductors 50 and 52 respectively.

In accordance with the present invention, either the voltage between electrode 30 and workpiece 28 may be varied, the feed rate of electrode 30 or both the voltage and feed rate may be varied in combination to control the diameter of the passage 26 being formed through workpiece 28. The hole size is directly proportional to the voltage between electrode 30 and workpiece 28 and inversely proportional to the feed rate of electrode 30; thus, an increase in the voltage with no change to the feed rate will result in an increase in hole diameter. A decrease in feed rate with no change to the voltage will also result in an increase in hole diameter and an increase in voltage and a decrease in electrode feed rate will also result in an increase in the hole diameter.

An encoder 54 is connected to ram 38 and CNC controller 46 by a suitable communications link 56 for sensing the depth of the electrode 30 as the electrode moves through the workpiece 28 to form the passage 26. Thus, the voltage and feed rate can be adjusted at predetermined depths to provide a desired hole diameter.

An acidic electrolyte 58 is pumped through electrode 30 and onto the surface of workpiece 28 by a pump 60. The pump 60 is connected to an outlet of an electrolyte supply tank 62. After the electrolyte impacts the surface of workpiece 28', it will be forced by fresh electrolyte 58 exiting electrode 30 under pressure to flow up and out of gap 36 and into catch basin 64 where it is permitted to drain back into supply tank 62. The electrolyte 58 carries away the ionized metal removed from workpiece 28.

Heat is generated during the electrolytic action and the electrolyte temperature can have an effect on the conductivity of the electrolyte 58 and thus on the hole size. The electrolyte 58 can reach a temperature at which it vaporizes in the machining gap 36 if not controlled. At this point, the current drastically drops, the electrolytic action reduces and a short circuit can occur between the electrode and the workpiece. A heat exchanger 66 is preferably provided to control the temperature of the electrolyte within the supply tank 62.

The pressure and flow rate of the electrolyte through electrode 30 may be controlled respectively by a pressure control valve 68 and a flow control valve 70. The pressure and flow rate of the electrolyte 58 preferably remains constant during a STEM operation. The pressure may typically be between about 20 p.s.i. and about 45 p.s.i. The flow rate will be a function of the inner diameter (ID) of electrode 30; for example, the flow rate may be about 3.5 ml./min. for an electrode having an ID of about 0.009" and about 120 ml./min. for an electrode having an ID of about 0.1". A pressure meter 72 and a flow meter 74 may be provided to monitor the electrolyte flow rate and pressure during a STEM operation. Additionally, a bypass valve 76 is provided to direct the electrolyte back into supply tank 62 while changes are made to the system 24. A filter 78 may also be provided to remove any contaminants which are not ionized into the electrolyte.

Figure 3:
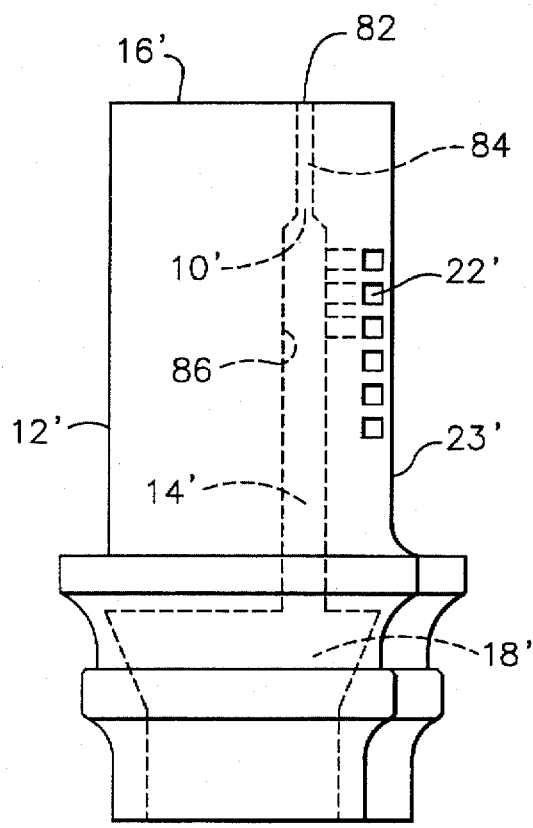
FIG. 3 is a side elevation view of a high pressure turbine blade with a metering hole formed therein in accordance with the present invention.

Referring now to FIG. 3, in accordance with the present invention, a radial hole 14' with a variable diameter along its depth is formed through a gas turbine engine blade 12' from the blade tip 16' to an interior plenum 18' of the blade 12' to integrally form a metering hole 10' proximate to blade tip 16'. The blade 12' is mounted in fixture 29 of STEM device 24 with electrode 30 positioned proximate to a location 82 on the surface of blade tip 16' at which the metering hole is to be formed. Depending upon the type of blade and the blade material and upon the electrode size a first selected DC voltage of between about 3 volts and about 15 volts is connected between electrode 30 and blade 12'. The acidic electrolyte 58 is then pumped through electrode 30 at a chosen pressure of about 5 p.s.i. to about 30 p.s.i., as a function of the ID of the electrode 30, and the electrode 30 is advanced into the component by CNC controller 46 at a first selected feed rate to cause removal or deplating of the blade material at a selected diameter in an upper portion 84 of radial hole 14' to form metering hole 10'. As an example, the first selected feed rate may be between about 0.020 in./min. to about 0.075 in./min. for an electrode having an ID of about 0.009" to drill a hole having a diameter of between about 0.022" to about 0.055". When a predetermined depth, depending upon the blade type, one of the DC voltage, electrode feed rate or both parameters in combination are switched to new values to cause a lower portion 86 of radial hole 14' to have a predetermined diameter larger than the diameter of the upper portion 84 of radial hole 14'. Thus, the metering hole 10' is formed entirely of the parent blade material and there are no extraneous plugs which can come out during engine operation and result in damage to the turbine blade 12'. Those skilled in the art will also recognize that the present invention eliminates the steps of fitting and brazing a tip plug 20 into radial hole 14 (FIG. 1), drilling metering hole 10 through tip plug 20 and x-raying the blade 12 to inspect the braze seal.

The diameters of the upper portion 84 and lower portion 86 of radial hole 14' are predetermined to provide the appropriate amount of film cooling air through trailing edge cooling holes 22' which are formed through the airfoil surface of turbine blade 12' and connect to radial hole 14' by known methods, such as EDM, laser drilling or the like. In this manner, cooling air circulates from plenum 18' through radial hole 14' and flows out trailing edge cooling holes 22' to cool the trailing edge 23' of blade 12' during engine operation and thereby prevent thermal damage to the blade 12'.

Figure 4:
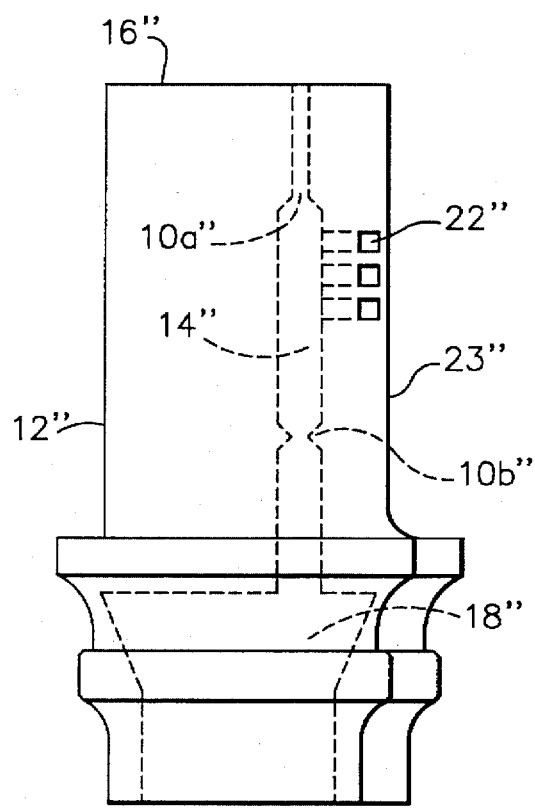
FIG. 4 is a side elevation view of a high pressure turbine blade with a metering hole having a plurality of different diameters along its depth formed in accordance with the present invention.
Figure 2:
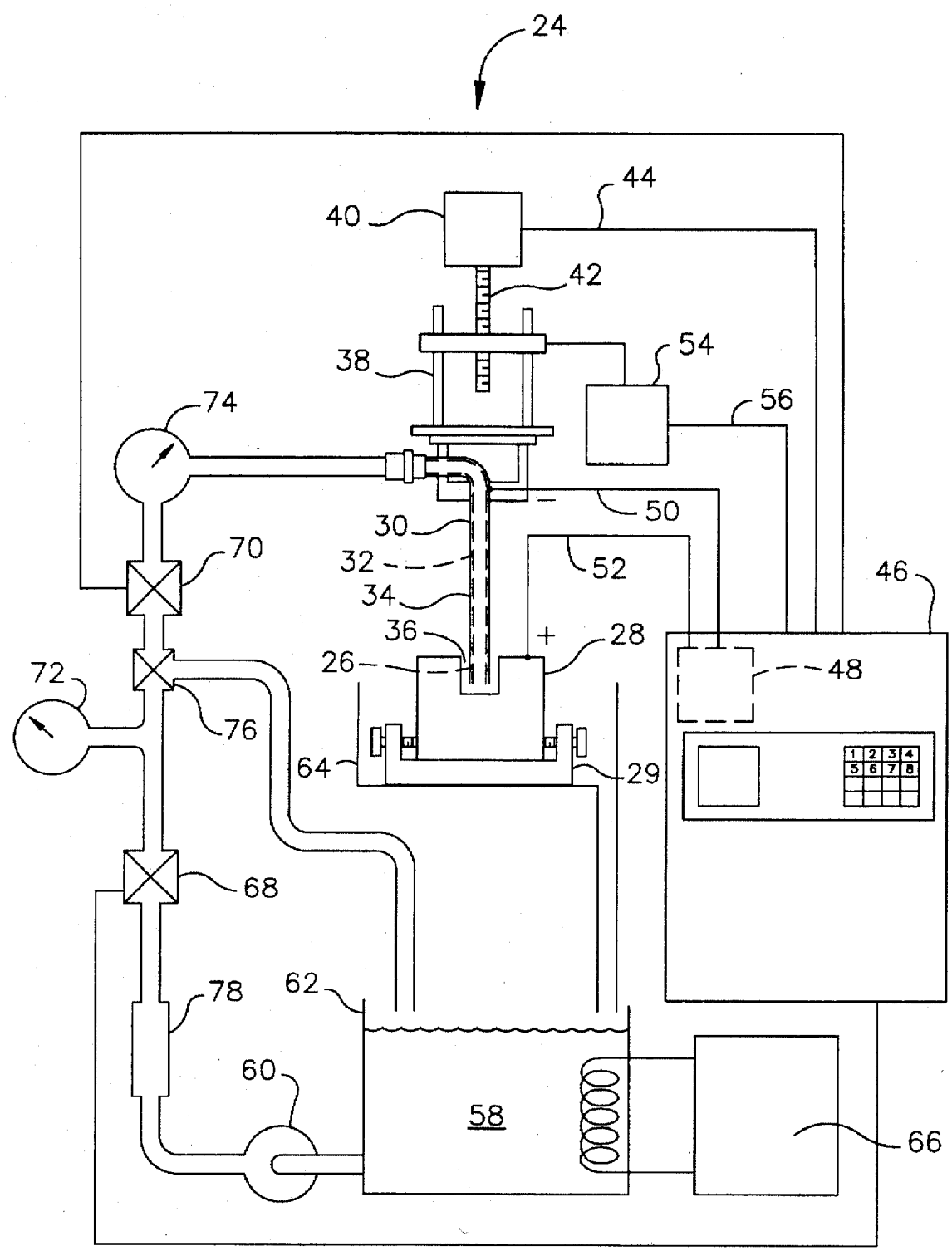
FIG. 2 is a schematic diagram of an STEM drilling apparatus for drilling a passage with a variable diameter along its depth through a workpiece in accordance with the present invention.

Referring to FIG. 4, in a further embodiment of the present invention, a variable diameter radial hole 14" may be formed through a turbine blade 12" from the blade tip 16" to a plenum 18" having a plurality of metering holes as illustrated by 10"a and 10"b. Radial hole 14" is formed by programming CNC controller 46 to respectively switch either the DC voltage between electrode 30 and blade 12", the feed rate of electrode 30 or both in combination to multiple different selected DC voltages and selected feed rates when different predetermined depths are sensed by encoder 54 to cause the diameter of radial hole 14" to vary along its depth as shown in FIG. 4. The variation in diameter of radial hole 10" will then control or meter the amount of cooling air which flows out of cooling holes 22".

It will be readily understood by those skilled in the art that the present invention is not limited to the specific embodiments described and illustrated herein. Different embodiments and adaptations besides those shown herein and described, as well as many variations, modifications and equivalent arrangements will now be apparent or will be reasonably suggested by the foregoing specification and drawings without departing from the substance or scope of the invention. While the present invention is described herein in detail in relation to its preferred embodiments, it is to be understood that this disclosure is only illustrative and exemplary of the present invention and is made merely for purposes of providing a full and enabling disclosure of the invention. Accordingly, it is intended that the invention is limited only by the spirit and scope of the claims appended hereto.

What is claimed is:

1. A method for forming a passage with a variable diameter along its depth in a conductive workpiece, comprising the steps of:

positioning an externally insulated hollow electrode having a predetermined inner and outer diameter proximate to a surface of the workpiece into which the passage is to be formed;

pumping an electrolyte through the electrode at a chosen pressure and onto the workpiece surface;

connecting a first selected DC voltage between the electrode and the workpiece, the voltage being connected with a polarity to cause the electrode to act as a cathode and the workpiece to act as an anode;

moving the electrode toward the workpiece at a first selected feed rate to cause a portion of the passage to be formed at a first predetermined diameter;

sensing a depth of the electrode as the electrode moves through the workpiece to form the passage; and switching at least one of the first selected DC voltage to a different selected DC voltage with the same polarity and the first selected feed rate to a different selected feed rate when a predetermined depth is sensed to cause another portion of the passage to be formed at a second predetermined diameter.

2. The method of claim 1, further comprising the step of switching at least one of the first selected DC voltage to a different one of a plurality of selected DC voltages and the first selected feed rate to a different one of a plurality of selected feed rates when each of a plurality of different predetermined depths is sensed to cause the passage to be formed with different diameters along the passage depth.

3. The method of claim 1, wherein both the first selected DC voltage and the first selected feed rate are each changed to a respective different selected voltage and a different selected feed rate in combination when a predetermined depth is sensed to cause another portion of the passage to be formed at a second predetermined diameter.

4. A method for forming a cooling air metering hole in a conductive gas turbine engine component, comprising the steps of:

positioning an externally insulated hollow electrode having a predetermined inner and outer diameter proximate to a surface of the component into which the metering hole is to be formed;

pumping an electrolyte through the electrode at a chosen pressure and onto the component surface;

connecting a first selected DC voltage between the electrode and the component, the first voltage being connected with a polarity to cause the electrode to act as a cathode and the component to act as an anode;

moving the electrode toward the component at a first selected feed rate to cause a first portion of a radial hole to be formed at a first predetermined diameter;

sensing a depth of the electrode as the electrode moves through the component to form the radial hole; and switching at least one of the first selected DC voltage to a higher selected voltage with the same polarity and the first selected feed rate to a lower selected feed rate when a predetermined depth is sensed to cause at least a second portion of the radial hole to be formed with a second predetermined diameter larger than the first diameter and to form the metering hole between the first and second portions.

5. The method of claim 4, further comprising the step of switching at least one of the selected DC voltage to a different one of a plurality of selected DC voltages and the selected feed rate to a different one of a plurality of selected feed rates when each of a plurality of different predetermined depths is sensed to cause the diameter of the radial hole to vary along its length and to form a plurality of metering holes therein.

6. The method of claim 4, wherein both the first selected DC voltage and the first selected feed rate are each changed to a respective different selected voltage and a different selected feed rate simultaneously to cause another portion of the metering hole to be formed at a larger predetermined diameter than the first predetermined diameter.

7. An apparatus for forming a passage with a variable diameter along its depth in a conductive workpiece, comprising:

an externally insulated hollow electrode having a predetermined inner and outer diameter;

a variable DC voltage source connectable between said electrode and the workpiece for supplying a selected voltage, and said voltage source being connectable to cause said electrode to act as a cathode and the workpiece to act as an anode;

means for pumping an acidic electrolyte through the electrode at a chosen pressure and onto a surface of the workpiece through which the passage is to be formed;

means for moving said electrode toward the workpiece at a selected feed rate to cause a portion of the passage to be drilled at a first predetermined diameter;

means for sensing a depth of said electrode as said electrode moves through the workpiece to form the passage; and means for switching at least one of said variable DC voltage source from the selected DC voltage to a different selected DC voltage with the same polarity and said moving means from said selected feed rate to a different selected feed rate when a predetermined depth is sensed to cause another portion of the passage to be formed at a second predetermined diameter.

8. The apparatus of claim 7, further comprising means for switching at least one of said variable voltage source to a different one of a plurality of selected DC voltages and said moving means to a different one of a plurality of selected feed rates when each of a plurality of different predetermined depths is sensed to cause the diameter of the passage to vary along its length.

* * * * *